(12) United States Patent
Kim

(10) Patent No.: US 6,905,103 B2
(45) Date of Patent: Jun. 14, 2005

(54) DISPLAY APPARATUS

(75) Inventor: Sung-gi Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/661,575

(22) Filed: Sep. 15, 2003

(65) Prior Publication Data

US 2004/0155166 A1 Aug. 12, 2004

(30) Foreign Application Priority Data

Sep. 13, 2002 (KR) .......................................... 2002-55810

(51) Int. Cl.[7] .............................................. A45D 17/04
(52) U.S. Cl. ..................................... 248/398; 248/919
(58) Field of Search .............................. 248/919, 917, 248/920, 922, 923, 398, 133, 371, 372.1, 139; 345/866, 905

(56) References Cited

U.S. PATENT DOCUMENTS

| | | | |
|---|---|---|---|
| 5,765,794 A | * 6/1998 | Chen ..................... 248/292.12 |
| 6,061,104 A | 5/2000 | Evanicky et al. |
| 6,231,021 B1 | * 5/2001 | Hong ......................... 248/371 |
| 6,340,146 B1 | * 1/2002 | Tzeng ......................... 248/317 |
| 6,484,994 B2 | * 11/2002 | Hokugoh ..................... 248/371 |
| 6,581,893 B1 | * 6/2003 | Lu .......................... 248/291.1 |
| 2003/0103092 A1 | * 6/2003 | Byoun et al. ............... 345/866 |
| 2003/0121124 A1 | * 7/2003 | Chen ........................... 16/339 |

FOREIGN PATENT DOCUMENTS

| | | |
|---|---|---|
| JP | 9-127882 | 5/1997 |
| JP | 11-184395 | 7/1999 |
| JP | 3072380 | 7/2000 |
| KR | 2000-14401 | 7/2000 |
| KR | 2001-468 | 1/2001 |
| KR | 20-240968 | 7/2001 |
| KR | 20-274596 | 4/2002 |

* cited by examiner

*Primary Examiner*—Leslie A. Braun
*Assistant Examiner*—Kofi Schulterbrandt
(74) *Attorney, Agent, or Firm*—Staas & Halsey, LLP

(57) ABSTRACT

A display apparatus has a monitor body. The display apparatus includes a supporting part disposed in the monitor body; a stand having an mounting part mutually coupled to the supporting part; and an elastic member interposed between the supporting part and the mounting part. Here, the display apparatus in which the monitor body is easily coupled to the stand thereof is provided.

10 Claims, 5 Drawing Sheets

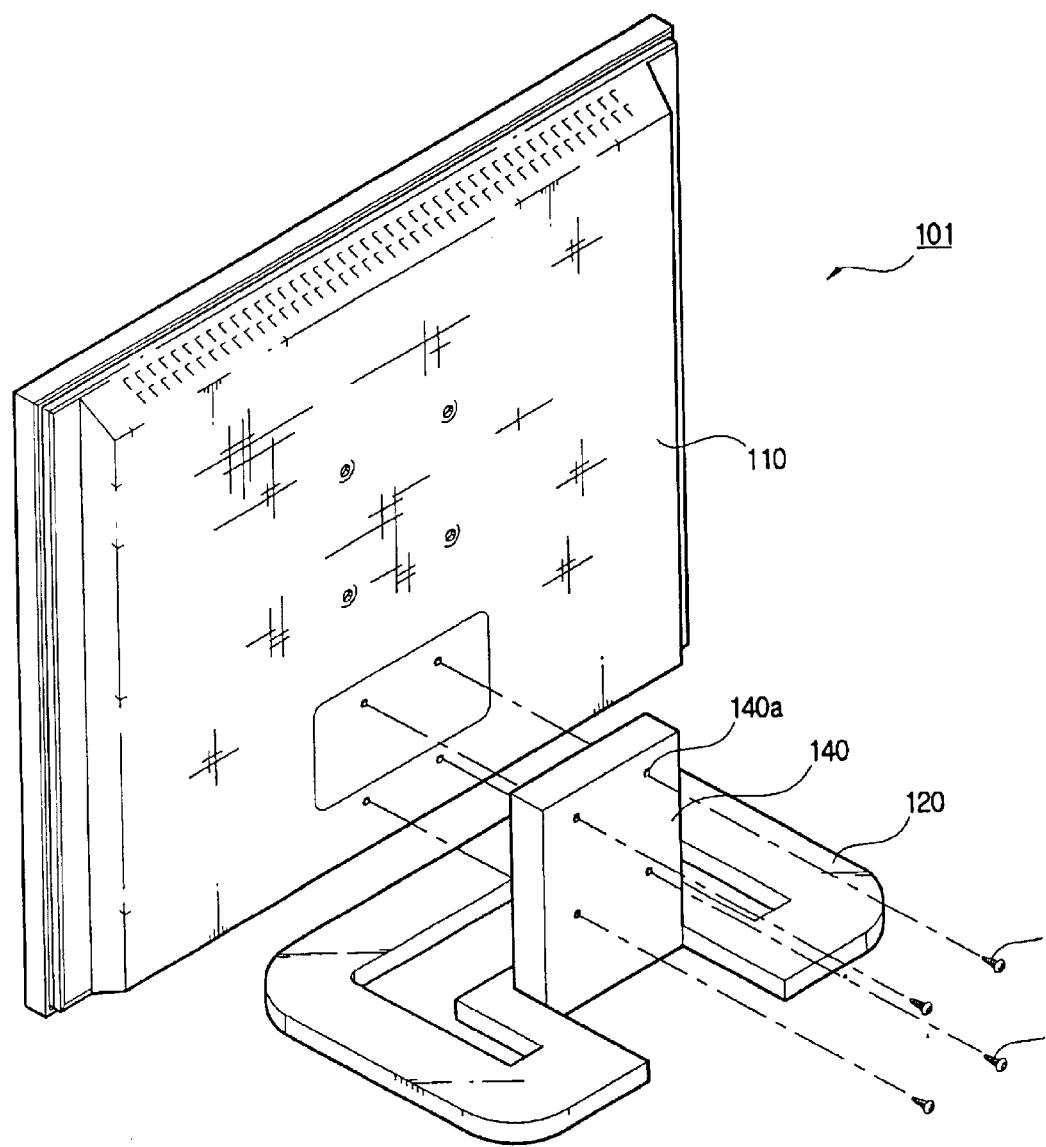

DISPLAY APPARATUS

CROSS-REFERENCE TO RELATED APPLICATIONS

This application claims the benefit of Korean Application No. 2002-55810, filed Sep. 13, 2002, in the Korean Intellectual Property Office, the disclosure of which is incorporated herein by reference.

BACKGROUND OF THE INVENTION

1. Field of the Invention

The present invention relates to a display apparatus, and more specifically, to a flat panel display apparatus having a stand member.

2. Description of the Related Art

Conventionally, a display apparatus 101, as shown in FIG. 5, comprises a monitor body 110 producing pictures and a base member 120 which supports the monitor body and is mounted on an installation place.

To one part of the base member 120 is coupled a connecting part 140 having a plurality of through holes 140a. Screws 130 are inserted into the through holes 140a in the connecting part 140 and screw-coupled to the rear side of the monitor body 110 such that the monitor body 110 is coupled to the base member 120.

This display apparatus 101 is conventionally used while being mounted on a table (hereinafter, referred to a table type), but can be used as desired, by being attached to a wall (hereinafter, referred to a wall type).

To install the conventional display apparatus 101 as the wall type, a user has to unscrew the screws 130 from the rear side of the monitor body 110 and remove the base member 120, and then couple a separate fixing apparatus (not shown) to the display apparatus 101, so that the display apparatus 101 can be attached to the wall.

In the case that the wall type display apparatus is converted into the table type display apparatus, a user has to unscrew the fixing apparatus with a driver and then couple the monitor body 110 to the base member 120. However, from the viewpoint of safety standards, to protect a consumer from an electrical shock and to prevent other problems, the disassembly from the rear side is desirably permitted only to skilled engineers, but not to a consumer.

SUMMARY OF THE INVENTION

Accordingly, it is an aspect of the present invention to provide a display apparatus in which a monitor body is easily coupled to a stand member thereof.

Additional aspects and advantages of the invention will be set forth in part in the description which follows and, in part, will be obvious from the description, or may be learned by practice of the invention.

The foregoing and/or other aspects of the present invention are achieved by providing a display apparatus having a monitor body, comprising: a supporting part disposed in the monitor body; a stand having an mounting part mutually coupled to the supporting part; and an elastic member interposed between the supporting part and the mounting part.

The display apparatus further comprises screws passing through the supporting part, the mounting part and the elastic member, to combine the supporting part, the mounting part and the elastic member together, so that the monitor body is tightly coupled to the stand.

It is an aspect of the invention that the elastic member includes a plate spring.

It is another aspect of the invention that the plate spring is attached to a wall part of the monitor body in the back of the supporting part.

It is another aspect of the invention that an upheaval part is formed in the mounting part so that the mounting part keeps off at a determined distance from the plate spring.

In yet another aspect of the invention, the display apparatus further comprises a compression spring which surrounds the screw and is interposed between the plate spring and the supporting part.

It is effective that the plate spring has a bent part bent toward the mounting part, wherein a slit of the predetermined width is formed in the bent part.

BRIEF DESCRIPTION OF THE DRAWINGS

These and/or other aspects and advantages of the present invention will become apparent and more readily appreciated from the following description of the embodiments, taken in conjunction with the accompany drawings of which:

FIG. 5 is a rear perspective view according to a conventional display apparatus.

DETAILED DESCRIPTION OF THE PREFERRED EMBODIMENT

Figure 1:
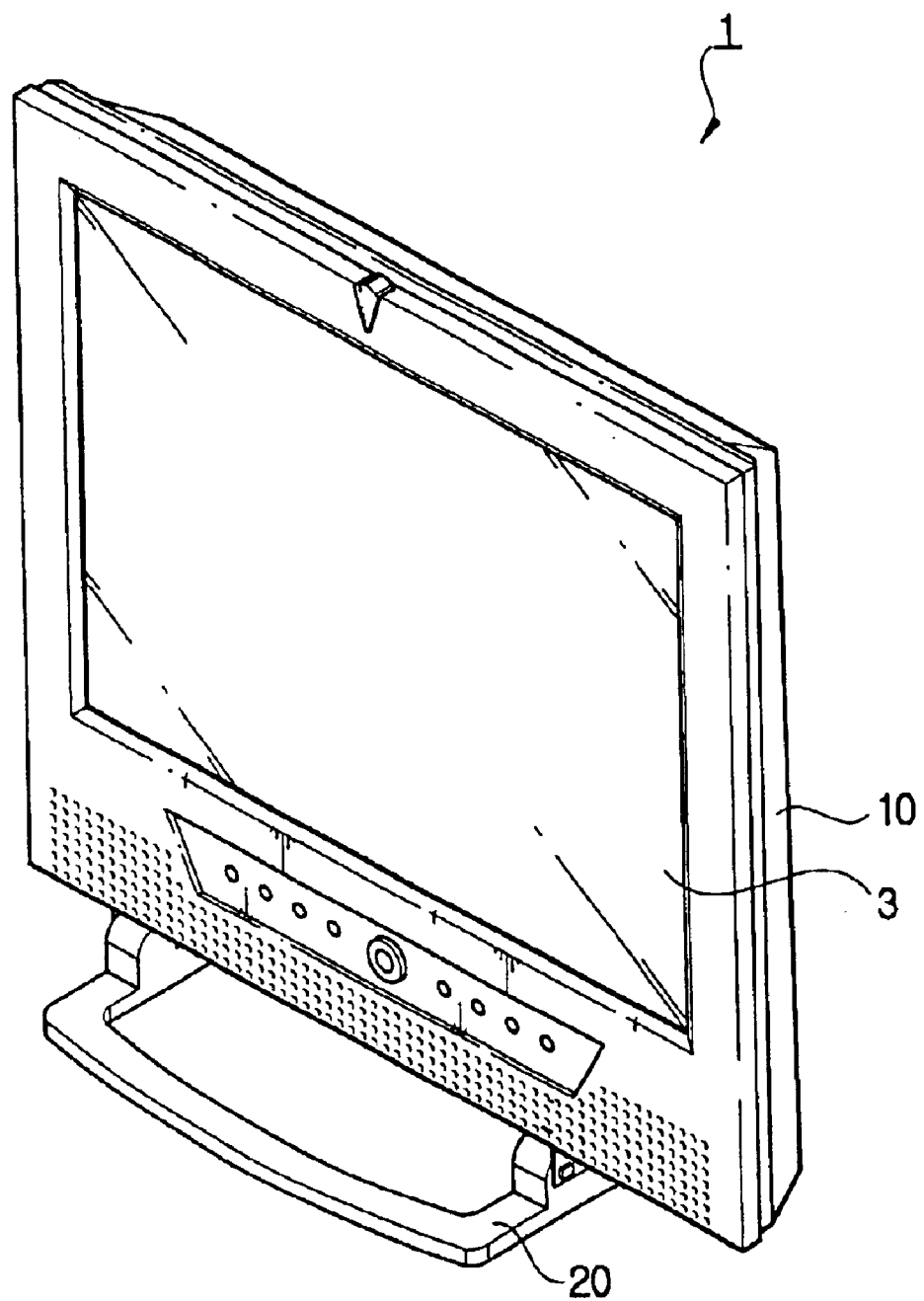
FIG. 1 is a perspective view illustrating a display apparatus according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
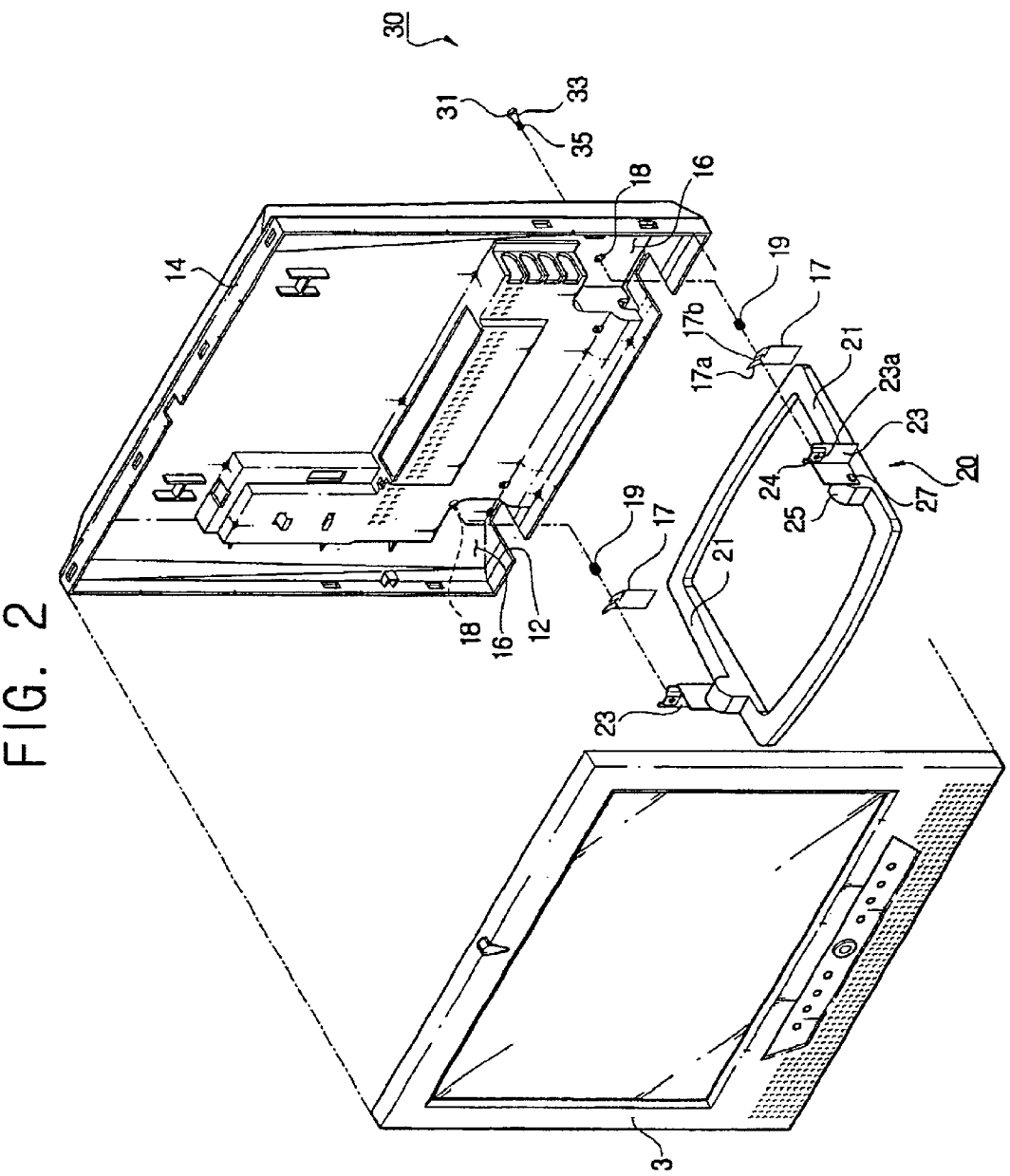
FIG. 2 is an exploded perspective view illustrating the display apparatus of FIG. 1.

As shown in FIGS. 1 and 2, a display apparatus 1 according to the present invention comprises a monitor body 10 producing images and a stand assembly 20 supporting the monitor body 10.

The monitor body 10 comprises an LCD (Liquid Crystal Display) panel 3 in which images are produced, a front cover 13 disposed in the front of the LCD panel 3 and a rear cover 14 disposed in the rear of LCD panel 3.

Holes 12 through which base brackets 23 of the stand assembly 20 are inserted into the monitor body 10 are formed in opposite sides of the bottom of the rear cover 14. Also, a pair of supporting parts 16 are formed above the holes 12, to receive the base brackets 23, to thereby install the stand assembly 20.

The base brackets 23 of the stand assembly 20 are disposed in the supporting part 16 to be coupled with the monitor body 10. The stand assembly 20 comprises a stand base 21 to be mounted on an installation place such as a table, and the pair of base brackets 23 rotatably coupled to the stand base 21 and having an L-shape cross-section, as shown in FIG. 2.

An upheaval part 24 whose cross-sectional shape is lifted up as a "⊏" shape, as shown FIG. 2, is formed at an upper end part of each base bracket 23 such that the base bracket 23 remains at a predetermined distance from a plate spring 17 to be described later. A screw hole 23a is formed in each upheaval part 24.

The stand base 21 has a rectangular frame shape and a pair of bracket joint parts 25 protruding from both edge sides thereof. A screw hole (not shown) is formed in the bracket joint part 25, and a stand screw 27 is screw-coupled into the screw hole to couple each base bracket 23 to the bracket joint part 25.

A screw 30, screwed to the rear cover 14 of the monitor body 10, comprises a head part 31, a body part 33 extended from the head part 31 and a screw part 35 on an end of the body part 33. Herein, the head part 31 of the screw 30 is embedded into the wall of the rear cover 14 and the body part 33 is installed to pass through a slit 17b formed in the plate spring 17, enclosed by a compression spring 19.

Figure 3:
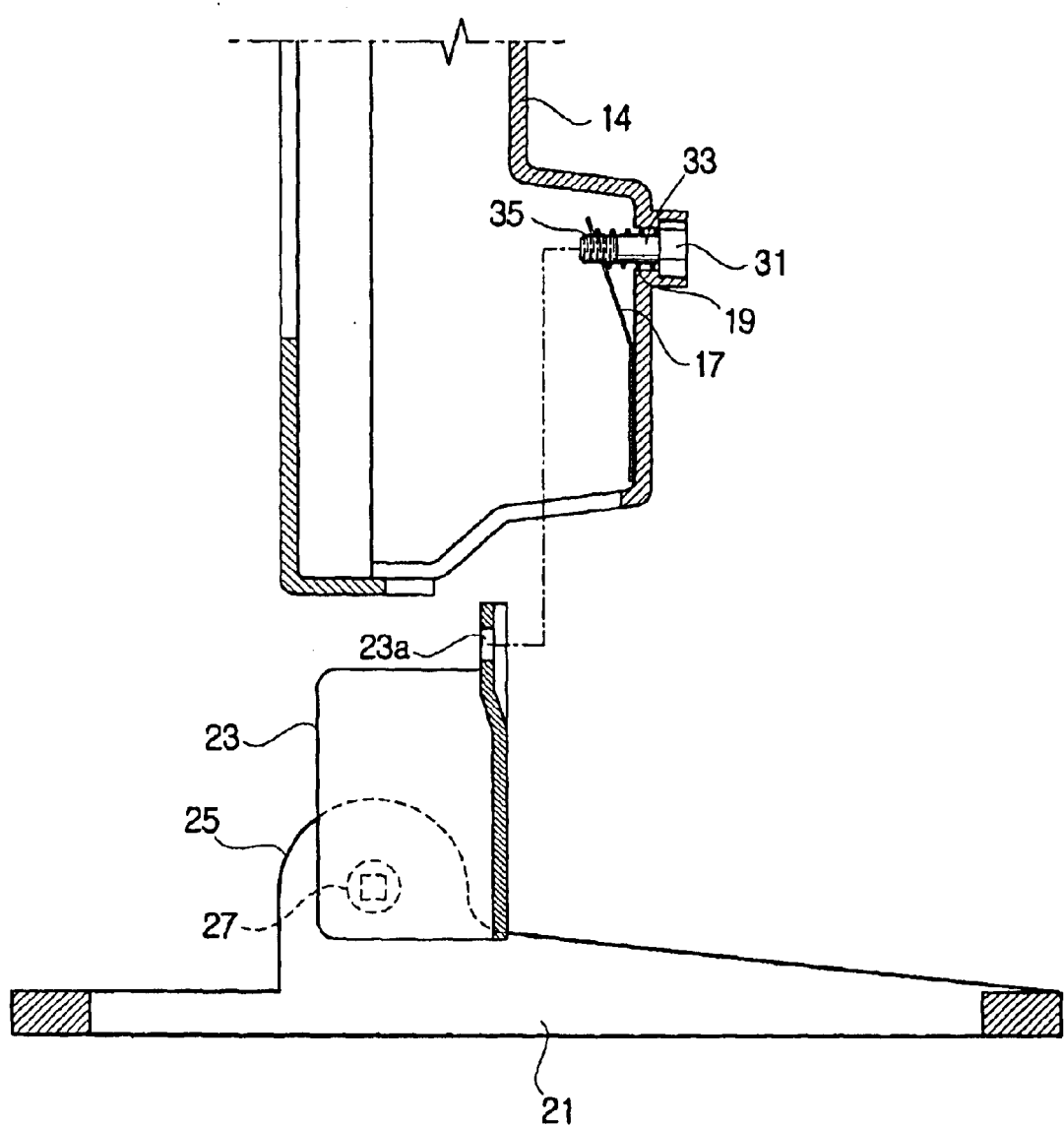
FIG. 3 is an exploded side sectional view of a monitor body and a stand assembly in the display apparatus of FIG. 1.

Screw through holes 18, into which the screws 30 are inserted, are formed in the wall of the rear cover 14 where each supporting part 16 of the monitor body 10 is formed. A part of the wall in which the screw through hole 18 is formed protrudes outward, to thereby accommodate the head part 31 of the screw 30, as shown in FIG. 3.

The plate spring 17 is attached to the inner wall of the rear cover 14 adjacent to the supporting parts 16. The plate spring 17 determines an installation position of the stand base 21 and reinforces the combination of the rear cover 14 and the base bracket 23. A bent part 17a is formed in the upper part of the plate spring 17, bent toward the base bracket 23, and a slit 17b, having a predetermined width whose edge is open, is formed in the bent part 17a. Thus the body part 33 of the screw 30 passing through the screw through hole 18 protrudes toward the base bracket 23 through the slit 17b of the plate spring 17.

With this configuration, the process to assemble the monitor apparatus is described as follows.

At first, the pair of base brackets 23 is coupled to the bracket joint parts 25 disposed at both edge sides of the stand base 21 by using the stand screws 27. The base brackets 23, coupled to the stand base 21, are inserted into the supporting part 16 of the monitor body.

Herein, the screw 30 is disposed previously so that the screw 30 is inserted into the screw through hole 18 of the rear cover 14, through the slit 17b of the plate spring 17.

Figure 4:
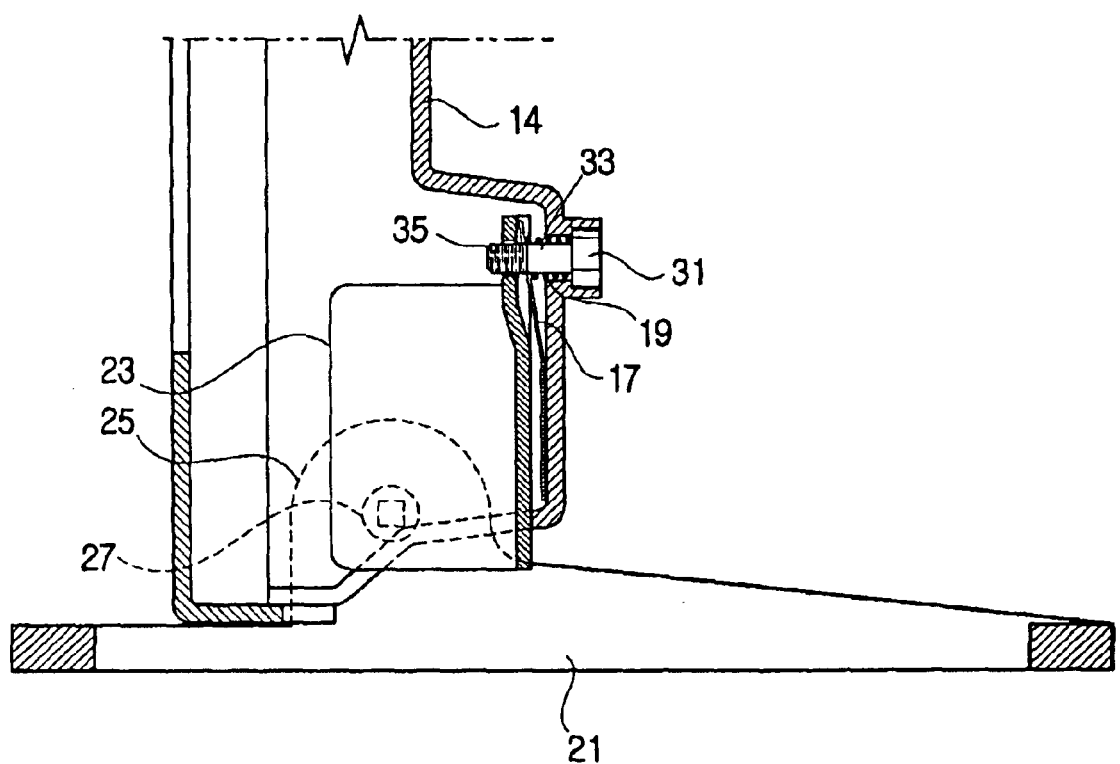
FIG. 4 is a combined side sectional view of the monitor body and the stand assembly in the display apparatus of FIG. 1.

A process that the base bracket 23 is installed in the supporting part 16 is described as follows. As shown in FIG. 3, as the base bracket 23 is inserted into the supporting part 16, the base bracket 23 pushes the bent part 17a of the plate spring 17. Accordingly, the bent part 17a of the plate spring 17 is extended, and thereby, pushes the screw 30 in the slit 17b of the bent part 17a thereof backward. If the screw hole 23a of the base bracket 23 and the screw 30 are aligned, the screw 30 goes forward to the base bracket 23 by a restoring force of the compression spring 19 such that the screw part 35 of the screw 30 is located near to the screw hole 23a of the base bracket 23. Thereafter, a user inserts a tool such as a screw driver into a slot (not shown) formed in a head part 31 of the screw 30 protruding outward of the rear cover 14 of the monitor body 10 and rotates the screw 30 by using the screw driver. Accordingly, as shown in FIG. 4, the screw part 35 of the screw 30 is inserted into the screw hole 23a of the base bracket 23 such that the base bracket 23 and the plate spring 17 are coupled to each other. By this way, the monitor body 10 is coupled to the stand assembly 20.

As described above, the base brackets 23 of the stand assembly 20 are inserted into the supporting parts 16 formed in the bottom of the monitor body for installing the base brackets 23, so that the base brackets 23 can be coupled to the monitor body 10 easily and firmly by the plate springs 17, the compression springs 17 and the screws 30.

As described above, according to the present invention, a display apparatus in which a monitor body is easily coupled to a stand member thereof is provided.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus having a monitor body, comprising:
   a supporting part disposed in the monitor body;
   a stand having a mounting part coupled to the supporting part;
   an elastic member interposed between the supporting part and the mounting part;
   screws passing through the supporting part, the mounting part and the elastic member, to combine the supporting part, the mounting part and the elastic member together; and
   compression springs,
   wherein the elastic member includes a plate spring, and
   wherein the compression springs surround the screws and are interposed between the plate spring and the supporting part.

2. The display apparatus according to claim 1, wherein the plate spring is attached to a wall part of the monitor body in the back of the supporting part.

3. The display apparatus according to claim 2, wherein an upheaval part is formed in the mounting part so that a portion of the mounting part remains at a predetermined distance from the plate spring.

4. The display apparatus according to claim 2, wherein the plate spring has a bent part bent toward the mounting part.

5. The display apparatus according to claim 3, wherein the plate spring has a bent part bent toward the mounting part.

6. The display apparatus according to claim 4, wherein a slit of the predetermined width is formed in the bent part.

7. The display apparatus according to claim 5, wherein a slit of the predetermined width is formed in the bent part.

8. A display apparatus with a monitor body, comprising:
   a stand with a pair of elastic members to elastically connect the monitor body and the stand together,
   wherein the monitor body includes:
   a pair of holes, each hole including a supporting part, a plate spring attached within an inner wall of the monitor body adjacent to the supporting part and within the hole to connect with respective ones of the pair of elastic members, and a compression spring interposed between each plate spring and supporting part, and
   wherein each of the elastic members includes:
   a bracket point part formed on the stand; and
   a base bracket rotatably extending from the bracket point part and having an upheaval part formed at an upper end of the base bracket to keep the base bracket at a predetermined distance from a respective plate spring when the monitor body and the stand are connected together.

9. The display apparatus according to claim 8, further comprising:

a screw extending through the supporting part such that the screw passes through a part of the plate spring when the stand and the monitor are connected together such that the plate spring reinforces the connection between the supporting part and the base bracket.

10. The display apparatus according to claim 9, wherein each plate spring comprises a bent part formed at an upper end thereof to engage with the respective base bracket.

* * * * *

UNITED STATES PATENT AND TRADEMARK OFFICE
CERTIFICATE OF CORRECTION

PATENT NO. : 6,905,103 B2
DATED : June 14, 2005
INVENTOR(S) : Sung-gi Kim et al.

It is certified that error appears in the above-identified patent and that said Letters Patent is hereby corrected as shown below:

<u>Column 4,</u>
Lines 59 and 61, change "point" to -- joint --.

Signed and Sealed this

Fourteenth Day of March, 2006

JON W. DUDAS
*Director of the United States Patent and Trademark Office*